United States Patent
Vrhel, Jr. et al.

(10) Patent No.: US 7,543,183 B2
(45) Date of Patent: Jun. 2, 2009

(54) METHOD AND SYSTEM FOR AUTOMATED TECHNICAL SUPPORT FOR COMPUTERS

(75) Inventors: Thomas Vrhel, Jr., Austin, TX (US); Gary D. Huber, Austin, TX (US); Roy W. Stedman, Austin, TX (US); James Van Artsdalen, Austin, TX (US); Krishnamurthy Venkatramani, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 283 days.

(21) Appl. No.: 10/636,315

(22) Filed: Aug. 7, 2003

(65) Prior Publication Data

US 2004/0128496 A1 Jul. 1, 2004

Related U.S. Application Data

(63) Continuation of application No. 09/413,422, filed on Oct. 6, 1999, now Pat. No. 6,606,716.

(51) Int. Cl.
*G06F 11/00* (2006.01)
(52) U.S. Cl. .................. 714/26; 714/27; 714/36; 714/55
(58) Field of Classification Search .......... 714/26, 714/27, 23, 34, 36, 47, 51, 55
See application file for complete search history.

(56) References Cited

U.S. PATENT DOCUMENTS

| | | | |
|---|---|---|---|
| 4,253,178 A | 2/1981 | Kolaczia | 368/285 |
| 4,268,904 A * | 5/1981 | Suzuki et al. | 710/40 |
| 4,356,545 A | 10/1982 | West | 714/46 |
| 4,438,458 A | 3/1984 | Munscher | 348/838 |
| 4,491,914 A | 1/1985 | Sujaku | 714/38 |

(Continued)

FOREIGN PATENT DOCUMENTS

GB 2065939 7/1981

(Continued)

OTHER PUBLICATIONS

CNET.com, "IBM to Get Colorful with New Notebooks" at Internet>http://news.cnet.com/news/0-1003-200-296049. html?tag=st.cn. 1fd2.<, printed Oct. 6, 1999.

(Continued)

*Primary Examiner*—Marc Duncan
(74) *Attorney, Agent, or Firm*—Baker Botts L.L.P.

(57) ABSTRACT

A method and system for automated support in a computer system. The computer system has a service button, and pressing of the service button causes a bit to be set in a register in the chip set. Setting of the bit generates an interrupt signal that is received and processed in a manner dependent on whether the computer system is in a booting state or a non-booting state. If the computer system is in a booting state, the bit is checked at a predetermined point in the booting sequence, and if set, a service application is initiated at that time. If the computer is not in a booting state, a second interrupt is generated, causing the service application to be initiated. A timer is initiated substantially with pressing of the service button, and if the service application reaches a predetermined point before the timer reaches a predetermined value, it will clear the timer. If not, the system will follow a predetermined reboot protocol.

15 Claims, 3 Drawing Sheets

U.S. PATENT DOCUMENTS

| | | | |
|---|---|---|---|
| 4,627,060 A | 12/1986 | Huang et al. | 714/36 |
| 4,635,187 A | 1/1987 | Baron et al. | 718/100 |
| 4,788,658 A | 11/1988 | Hanebuth | 361/684 |
| 4,809,280 A | 2/1989 | Shonaka | 714/55 |
| 4,916,699 A | 4/1990 | Ohashi | 714/46 |
| 4,964,077 A | 10/1990 | Eisen et al. | 345/707 |
| 5,010,551 A | 4/1991 | Goldsmith et al. | 714/46 |
| 5,017,030 A | 5/1991 | Crews | 400/485 |
| 5,060,135 A | 10/1991 | Levine et al. | 345/769 |
| 5,196,993 A | 3/1993 | Herron et al. | 361/681 |
| 5,214,695 A | 5/1993 | Arnold et al. | 713/2 |
| 5,224,024 A | 6/1993 | Tu et al. | 361/831 |
| 5,228,655 A | 7/1993 | Garcia et al. | 248/118 |
| 5,276,805 A | 1/1994 | Hamaguchi | 345/537 |
| 5,287,448 A | 2/1994 | Nicol et al. | 345/707 |
| 5,287,505 A | 2/1994 | Calvert et al. | 707/10 |
| 5,325,521 A | 6/1994 | Koyama et al. | 714/55 |
| 5,346,410 A | 9/1994 | Moore, Jr. | 439/607 |
| 5,348,408 A | 9/1994 | Gelardi et al. | 400/715 |
| 5,353,240 A | 10/1994 | Mallory et al. | 702/186 |
| 5,355,357 A | 10/1994 | Yamamori et al. | 369/75.2 |
| 5,356,099 A | 10/1994 | Sereboff | 248/118.1 |
| 5,367,667 A | 11/1994 | Wahlquist et al. | 714/32 |
| 5,374,018 A | 12/1994 | Daneshvar | 248/118 |
| 5,375,800 A | 12/1994 | Wilcox et al. | 248/118.1 |
| 5,381,526 A | 1/1995 | Ellson | 345/530 |
| 5,388,032 A | 2/1995 | Gill et al. | 700/17 |
| 5,390,324 A | 2/1995 | Burckhartt et al. | 714/23 |
| 5,392,095 A | 2/1995 | Siegel | 399/8 |
| 5,398,333 A | 3/1995 | Schieve et al. | 714/36 |
| 5,410,447 A | 4/1995 | Miyagawa et al. | 361/681 |
| 5,422,751 A | 6/1995 | Lewis et al. | 349/59 |
| 5,423,605 A | 6/1995 | Liu | 312/265.6 |
| 5,432,927 A | 7/1995 | Grote et al. | 713/2 |
| 5,443,237 A | 8/1995 | Stadtmauer | 248/441.1 |
| 5,450,576 A | 9/1995 | Kennedy | 713/2 |
| 5,454,080 A | 9/1995 | Fasig et al. | 710/302 |
| 5,455,933 A | 10/1995 | Schieve et al. | 714/27 |
| 5,471,674 A | 11/1995 | Stewart et al. | 713/2 |
| 5,483,437 A | 1/1996 | Tang | 363/146 |
| 5,503,484 A | 4/1996 | Louis | 400/489 |
| 5,513,319 A | 4/1996 | Finch et al. | 714/55 |
| 5,522,572 A | 6/1996 | Copeland et al. | 248/118 |
| 5,526,180 A | 6/1996 | Rausnitz | 359/609 |
| 5,530,847 A | 6/1996 | Schieve et al. | 714/38 |
| 5,537,585 A | 7/1996 | Blickenstaff et al. | 707/205 |
| 5,537,618 A | 7/1996 | Boulton et al. | 345/745 |
| 5,547,154 A | 8/1996 | Kirchoff et al. | 248/118.3 |
| 5,547,272 A | 8/1996 | Paterson et al. | 312/223.2 |
| 5,564,054 A | 10/1996 | Bramnick et al. | 713/2 |
| 5,592,362 A | 1/1997 | Ohgami et al. | 361/686 |
| 5,596,481 A | 1/1997 | Liu et al. | 361/683 |
| 5,596,482 A | 1/1997 | Horikoshi | 361/683 |
| 5,627,964 A | 5/1997 | Reynolds et al. | 714/46 |
| 5,649,200 A | 7/1997 | Leblang et al. | 717/122 |
| 5,668,992 A | 9/1997 | Hammer et al. | 713/1 |
| 5,678,002 A | 10/1997 | Fawcett et al. | 345/709 |
| 5,680,640 A | 10/1997 | Ofek et al. | 710/19 |
| 5,689,253 A | 11/1997 | Hargreaves et al. | 341/22 |
| 5,689,706 A | 11/1997 | Rao et al. | 707/201 |
| 5,694,293 A | 12/1997 | Seto et al. | 361/687 |
| 5,701,495 A * | 12/1997 | Arndt et al. | 710/263 |
| 5,708,776 A | 1/1998 | Kikinis | 714/55 |
| 5,708,812 A | 1/1998 | Van Dyke et al. | 717/171 |
| 5,724,224 A | 3/1998 | Howell et al. | 361/680 |
| 5,727,163 A | 3/1998 | Bezos | 705/27 |
| 5,732,268 A | 3/1998 | Bizzarri | 713/2 |
| 5,748,877 A | 5/1998 | Dollahite et al. | 714/36 |
| 5,759,644 A | 6/1998 | Stanley | 428/14 |
| 5,768,370 A | 6/1998 | Maatta et al. | 379/433.01 |
| 5,775,822 A | 7/1998 | Cheng | 400/489 |
| 5,778,372 A | 7/1998 | Cordell et al. | 707/100 |
| 5,790,796 A | 8/1998 | Sadowsky | 709/221 |
| 5,796,579 A | 8/1998 | Nakajima et al. | 361/683 |
| 5,797,281 A | 8/1998 | Fox | 63/12 |
| 5,803,416 A | 9/1998 | Hanson et al. | 248/118 |
| 5,805,882 A | 9/1998 | Cooper et al. | 713/2 |
| 5,809,248 A | 9/1998 | Vidovic | 709/219 |
| 5,809,511 A | 9/1998 | Peake | 707/204 |
| 5,818,635 A | 10/1998 | Hohn et al. | 359/612 |
| 5,819,274 A | 10/1998 | Jackson, Jr. | 707/10 |
| 5,825,355 A | 10/1998 | Palmer et al. | 345/712 |
| 5,825,506 A | 10/1998 | Bednar et al. | 358/402 |
| 5,826,839 A | 10/1998 | Chen | 248/118 |
| 5,832,522 A | 11/1998 | Blickenstaff et al. | 707/204 |
| 5,835,344 A | 11/1998 | Alexander | 361/683 |
| 5,845,136 A | 12/1998 | Babcock | 713/300 |
| 5,852,545 A | 12/1998 | Pan-Ratzlaff | 361/683 |
| 5,854,828 A | 12/1998 | Kocis et al. | 379/93.31 |
| 5,860,001 A | 1/1999 | Cromer et al. | 713/1 |
| 5,860,002 A | 1/1999 | Huang | 713/2 |
| 5,860,012 A | 1/1999 | Luu | 717/175 |
| 5,861,884 A | 1/1999 | Fujioka | 345/705 |
| 5,881,236 A | 3/1999 | Dickey | 709/221 |
| 5,884,073 A | 3/1999 | Dent | 713/2 |
| 5,894,571 A | 4/1999 | O'Connor | 713/2 |
| 5,904,327 A | 5/1999 | Cheng | 248/118.1 |
| 5,905,632 A | 5/1999 | Seto et al. | 361/683 |
| 5,906,506 A | 5/1999 | Chang et al. | 439/500 |
| 5,909,544 A | 6/1999 | Anderson, II et al. | 709/208 |
| 5,939,694 A | 8/1999 | Holcomb et al. | 235/381 |
| 5,953,533 A | 9/1999 | Fink et al. | 717/175 |
| 5,955,797 A | 9/1999 | Kim | 307/150 |
| 5,960,189 A | 9/1999 | Stupek, Jr. et al. | 717/169 |
| 5,960,204 A | 9/1999 | Yinger et al. | 717/176 |
| 5,960,411 A | 9/1999 | Hartman et al. | 705/26 |
| 5,963,743 A | 10/1999 | Amberg et al. | 717/174 |
| 5,974,546 A | 10/1999 | Anderson | 713/2 |
| 5,978,911 A | 11/1999 | Knox et al. | 713/1 |
| 5,983,369 A | 11/1999 | Bakoglu et al. | 714/46 |
| 5,991,543 A | 11/1999 | Amberg et al. | 717/175 |
| 5,995,757 A | 11/1999 | Amberg et al. | 717/175 |
| 6,006,344 A | 12/1999 | Bell, Jr. | 714/37 |
| 6,012,154 A | 1/2000 | Poisner | 714/55 |
| 6,014,744 A | 1/2000 | McKaughan et al. | 713/2 |
| 6,023,267 A | 2/2000 | Chapuis et al. | 345/810 |
| 6,029,257 A | 2/2000 | Palmer | 714/40 |
| 6,029,258 A | 2/2000 | Ahmad | 714/46 |
| 6,032,157 A | 2/2000 | Tamano et al. | 707/104.1 |
| 6,034,869 A | 3/2000 | Lin | 361/686 |
| 6,038,597 A | 3/2000 | Van Wyngarden | 709/219 |
| 6,047,261 A | 4/2000 | Siefert | 705/11 |
| 6,049,342 A | 4/2000 | Nielson et al. | 345/473 |
| 6,049,454 A | 4/2000 | Howell et al. | 210/172 |
| 6,050,833 A | 4/2000 | Danzyger et al. | 439/92 |
| 6,056,136 A | 5/2000 | Taber et al. | 215/252 |
| 6,061,788 A | 5/2000 | Reynaud et al. | 713/2 |
| 6,061,810 A | 5/2000 | Potter | 714/23 |
| 6,065,136 A | 5/2000 | Kuwabara | 714/31 |
| 6,104,874 A | 8/2000 | Branson et al. | 717/108 |
| 6,108,697 A | 8/2000 | Raymond et al. | 709/218 |
| 6,112,320 A | 8/2000 | Dien | 714/51 |
| 6,113,050 A | 9/2000 | Rush | 248/346.01 |
| 6,166,729 A | 12/2000 | Acosta et al. | 345/719 |
| 6,167,383 A | 12/2000 | Henson | 705/26 |
| 6,167,532 A | 12/2000 | Wisecup | 714/23 |
| 6,170,065 B1 | 1/2001 | Kobata et al. | 714/7 |
| 6,182,212 B1 | 1/2001 | Atkins et al. | 713/1 |
| 6,182,275 B1 | 1/2001 | Beelitz et al. | 717/175 |
| 6,199,204 B1 | 3/2001 | Donohue | 717/178 |
| 6,202,207 B1 | 3/2001 | Donohue | 717/173 |
| 6,226,412 B1 | 5/2001 | Schwab | 382/232 |
| 6,236,901 B1 | 5/2001 | Goss | 700/95 |
| 6,247,126 B1 | 6/2001 | Beelitz et al. | 713/1 |

| | | | |
|---|---|---|---|
| 6,256,620 B1 | 7/2001 | Jawahar et al. | 707/2 |
| 6,263,215 B1 | 7/2001 | Patton et al. | 455/561 |
| 6,272,484 B1 | 8/2001 | Martin et al. | 707/1 |
| 6,279,109 B1 | 8/2001 | Brundridge | 713/2 |
| 6,279,125 B1 | 8/2001 | Klein | 714/38 |
| 6,279,156 B1 | 8/2001 | Amberg et al. | 717/124 |
| 6,298,443 B1 | 10/2001 | Colligan et al. | 713/200 |
| 6,298,457 B1 | 10/2001 | Rachlin et al. | 714/49 |
| 6,331,936 B1 | 12/2001 | Hom et al. | 361/686 |
| 6,356,977 B2 | 3/2002 | Ofek et al. | 711/112 |
| 6,367,035 B1 | 4/2002 | White | 714/40 |
| 6,385,737 B1 | 5/2002 | Benignus et al. | 714/22 |
| 6,393,586 B1 | 5/2002 | Sloan et al. | 714/25 |
| 6,438,684 B1 * | 8/2002 | Mitchell et al. | 713/1 |
| 6,449,735 B1 | 9/2002 | Edwards et al. | 714/25 |
| 6,601,040 B1 * | 7/2003 | Kolls | 705/14 |
| 6,606,716 B1 * | 8/2003 | Vrhel et al. | 714/32 |
| 6,665,758 B1 * | 12/2003 | Frazier et al. | 710/200 |
| 6,892,331 B2 * | 5/2005 | Da Palma et al. | 714/55 |
| 2003/0204792 A1 * | 10/2003 | Cahill et al. | 714/55 |

FOREIGN PATENT DOCUMENTS

| | | |
|---|---|---|
| GB | 2329266 | 3/1999 |
| GB | 2356271 | 5/2001 |
| WO | WO 93/00628 | 1/1993 |
| WO | WO 94/08289 | 4/1994 |
| WO | WO 97/09676 | 3/1997 |
| WO | WO 98/18086 | 4/1998 |

OTHER PUBLICATIONS

3Com, "Palm Computer, News and Promotions" at Internet >http://www.palm.com/pr/holidaydebut.html<, printed Oct. 5, 1999.

@Backup Company, "@Backup Company Information Page" at Internet, http://security.atbackup.com/VID101.3.819255.0/Company.htm, printed Jun. 15, 1999.

@Backup Company, "@Backup Company Frequently Asked Questions" at Internet, http://security.atbackup.com/VID101.3.819255.0/FAQ.asp, printed Jun. 15, 1999.

@Backup Company, "Frequently Asked Questions: Technical" at Internet, http://security.atbackup/com.VID101.3.819255.0/Tech.asp, printed Jun. 15, 1999.

@Backup Company, "Are You Protected" at Internet, http://security.atbackup/com.VID101.3.819255.0/Main.asp, printed Jun. 15, 1999.

Exploriing Windows NT "ZD Journals" at Internet>http://www.zdjournals.com/9802.ewn9821.html<, printed Oct. 18, 1999.

PCWorld News "Compaq Debuts Home PCs" at Internet <http://www2.pcworld.com.html>, printed Oct. 18, 1999.

"HP builds in Net button," at Internet <http://news.cnet.com/news/0-1003-202-316545.html>, printed Oct. 18, 1999.

"Packard Bell PCs provide state-of-the-art technology and complete user support" at <http://www.gadgetguru.com.html>, printed Oct. 18, 1999.

Compaq Computer Corporation, Press Release, "New PCs Offer Equipment, Colour and Personality; Compaq's Presario Range Opened Up for Customisation" at Internet >http://biz.yahoo.com/prnews/000719/compaq_new.html<, printed Jul. 24, 2000.

Compaq Computer Corporation, "Home and Home Office Computing, My Style" at Internet >wysiwyg://3/http://athome.compaq.com/showroom/static/splash.asp<, printed Jul. 18, 2000.

Epson, "Epson Stylus Color 74i It makes a Colorful Case for Being Your iMac Printer" at Internet >http://www.epson.com/printer/inkjet/sty740i.html<, printed Jul. 24, 2000.

Radio Shack, advertisement, p. 2, Aug. 20, 2000.

Great Britain Search and Examination Report 0019866.3, Mar. 12, 2001.

Wilson et al., "Knowledge based interface to manufacturing computer system," ACM pp. 1183-1189, 1988.

Green, "Component based software development: implications for documentation", ACM pp. 159-164, 1999.

Hall et al., "A Cooperative approach to support software deployment using software dock", ACM ICSE pp. 174-183, 1999.

Written Opinion for Singapore Application No. 20000438002 Feb. 8, 2000.

\* cited by examiner

METHOD AND SYSTEM FOR AUTOMATED TECHNICAL SUPPORT FOR COMPUTERS

CROSS-REFERENCE TO RELATED APPLICATIONS

This application is a continuation of application Ser. No. 09/413,422, filed Oct. 6, 1999, now U.S. Pat. No. 6,606,716 which is incorporated herein by reference.

TECHNICAL FIELD

This patent application relates in general to the field of computing devices, and more particularly to a method and system for automating support for computers.

BACKGROUND

Personal computer systems have become increasingly common in businesses and households. Although the term "personal computer" implies a generic device, "personal computers" generally have a wide diversity of hardware and software components. For instance, different personal computers may have processors and buses of different speeds, hard drive and RAM memories of different sizes, and peripheral devices interfaced with different types of interface cards, such as audio devices. Further, a large array of manufacturers produce computer components so that in a given personal computer, even components having substantially similar operating characteristics may have important differences based on each component's manufacturer specification.

With respect to software, generally all personal computers have a common need for an operating system that coordinates the operation of hardware components. However, each individual personal computer may have one of many possible operating systems. For instance, Microsoft products have evolved from its original Disk Operating System ("DOS") to Windows systems, including Windows 3.1, Windows 95, Windows 98, Windows CE and Windows NT. In addition to these Microsoft operating systems, other types of operating systems are available, such as different versions of Unix, including Linux.

In addition to this wide diversity of operating systems, personal computers may operate a large number of different types of software applications. A given software application may interact in different manners with different operating systems. Thus, even with substantially similar hardware components, personal computers having different software may operate in substantially different manners.

Computer users can experience difficulties in system operation for many reasons. Lack of knowledge, hardware faults, software incompatibilities, and many other causes can lead to problems for the computer user. Given the wide range of hardware and software available (which implies an even greater range of hardware/software combinations that a user can experience), it is difficult to determine if the computer has a problem.

This situation is further complicated by the fact that personal computers do not have good mechanisms to automatically determine if the hardware/software system is having a problem. While certain operating systems contain code that help sense some types of problems with specific pieces of hardware, such mechanisms may be insufficiently uniform for determining if the operating system has a problem. Indeed, a common symptom of an operating system problem is a failure to boot, in which case the OS cannot be counted on to help. Another common symptom of an operating system problem is a hang, in which case the operating system becomes unresponsive to the keyboard and mouse for a wide variety of possible causes. It should be noted that this type of problem can be caused by pieces of software which have been installed on top of the operating system, such as an application or driver, or some incompatibility between pieces of software that have been loaded. A system that was operational may stop functioning at some later point due to software incompatibilities.

Another issue is the lack of a uniform mechanism for the user to invoke assistance. If the user has a question or the system has a problem, or at least the user perceives a problem, there is currently no uniform mechanism to get the system to attempt to provide assistance to the user. Although there are various types of help available to the user, they rely on one or more working input devices, such as a mouse and/or a keyboard, and a sufficient level of user knowledge to be able to navigate to one of a variety of information sources on the system and on a global information source such as the internet.

SUMMARY

Therefore, a need has arisen for a method and system for identifying and resolving personal computer system problems that is accessible through a uniform fail-safe mechanism regardless of the functional state of the operating system and other software, and can be implemented on a wide variety of operating systems.

A further need exists for a method and system that detects when an operating system has failed to boot or has hung and can take appropriate corrective actions.

A further need exists for such a system that includes a monitoring system that communicates with the operating system and vice versa, and that is capable of doing so with a wide variety of different operating systems.

A further need exists for such a standard mechanism that will attempt to resolve operating system hang conditions regardless of whether the assistance has been requested by the user during boot or otherwise, and regardless of whether the user has made multiple requests for assistance.

In accordance with the present disclosure, a method and system is provided that substantially eliminates or reduces disadvantages and problems associated with previously developed methods and systems for identifying computer system problems. A monitoring system detects problems with a computer system and aides in identifying and resolving the problems. The current level of functionality of the computer system is determined, and technical support is provided for the computer system in accordance with the functionality of the computer system.

For example, in one embodiment, a user initiates operating system monitoring by pressing a service button to indicate a problem with the computer system. The pressing of the service button initiates support functions, such as the initiation of a service application, at an appropriate time. The support functions allow testing of the computer system by the monitoring system. The service button initiates a watchdog timer that acts as a hang detection timer. An operating system hang-up error is identified if the hang detection timer remains uncleared after a predetermined hang detection time. Detection of a computer failure results in the system following a predetermined reboot protocol, such as that described in co-pending U.S. application Ser. No. 09/377,726, which is incorporated herein by reference.

More specifically, in one embodiment a method for automated support is provided in a computer system having a service button and a controller chip set. The method includes the steps of pressing the service button, setting a first bit in a general purpose input register in the controller chip set to generate a first interrupt signal in response to the pressing step, receiving the first interrupt and determining whether the computer system is booting, and if the system is booting then initiating a service application routine in a first manner, or if the system is not booting then initiating a service application routine in a second manner.

A method is also provided for automated support of a computer system having a controller chip set including the steps of pressing a service button, setting a bit in a general purpose input register in the chip set, generating a first interrupt of a first type as a result of the bit being set, and initiating a service application in a manner dependent on whether the computer system is booting or not.

A computer system is also provided having a processor with at least one timer, a controller chip set, a system BIOS, and an operating system for communicating with components of the computer system through the BIOS. A service button is coupled with a general purpose input register in the chip set for setting the register for generating a first interrupt. The system further includes an interrupt handler that is coupled to the input register for receiving the first interrupt and processing it in a manner dependent on whether the computer system is in a booting state or a non-booting state.

A computer system having a system BIOS and an operating system is also provided, wherein the computer system includes a service button coupled to a general purpose input register in a controller chip set for setting a bit in the register to generate a first interrupt signal. An interrupt handler in the system BIOS receives the first interrupt signal and initiates a second interrupt signal to the operating system to initiate a service application if the computer system is not in a booting state. If the computer is in a booting state the bit remains set, and code contained within the operating system checks the status of the bit later during the booting sequence and initiates the service application if the bit has been set.

The present invention provides many important technical advantages. One important technical advantage is integrated support for detecting problems associated with computer systems. One such advantage is a robust user interface that is simple and uncomplicated to use. For instance, a user with a question or problem simply pushes a single service button. Pressing the service button generates an interrupt directly into the chip set to alert the monitoring system that service is requested by the user. The direct interface of the service button to the chip set enhances reliability and simplicity, as the user's input to the service button does not have to rely on the operation of computer components, such as a keyboard or mouse. Additionally, a user may press the service button at any time to seek assistance. The means by which pressing of the service button initiates a service application ensures that the service application will be run at the appropriate time, regardless of when the service button is pressed, and regardless of whether it is pressed multiple times. Further, the system and method of the present invention can be easily implemented with a variety of different operating systems.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION

Preferred embodiments of the present invention are illustrated in the Figures, like numeral being used to refer to like and corresponding parts of the various drawings.

A healthy operating system monitors hardware and software operations on a computer system At times, the operating system detects difficulties or problems with the computer system and provides notice of the difficulties or problems to the computer system user. Help systems generally associated with the operating system can help to resolve difficulties or problems either automatically or through user interaction, such as by asking questions. However, when the operating system itself has a problem or there are software incompatibilities, it is difficult for the operating system to address those problems. Frequently, the operating system either shuts down or hangs up without providing further notice of the problem to the computer system user.

To improve computer system problem detection, identification and resolution, a monitoring system associated with the computer system's BIOS monitors operating system functionality. The monitoring system detects operating system boot failures and various types of operating system hang-ups. Once a problem is detected, remedial action is automatically taken to recover a failed computer system using a uniform mechanism that takes advantage of operational aspects of the computer system. For instance, a single push of a service button provides an interrupt to the computer system chip set for automatically invoking the highest available level of user assistance as determined by computer system health and state. The service button may be pressed by a user while the computer system is in POST, booting, in service mode or in normal mode. When the service button is pressed, the BIOS sets a bit in a general purpose input register in the controller chip set and generates an interrupt. State-sensitive interrupt handler code in BIOS takes appropriate action, and may communicate to the operating system, depending upon the state of computer system as represented by certain CMOS bits. Further, the interrupt handler code ensures that only appropriate action is taken regardless of the number of times the service button is successively pressed. The manner in which the service button invokes user assistance will now be described in more detail with reference to FIGS. 1-3.

Figure 1:
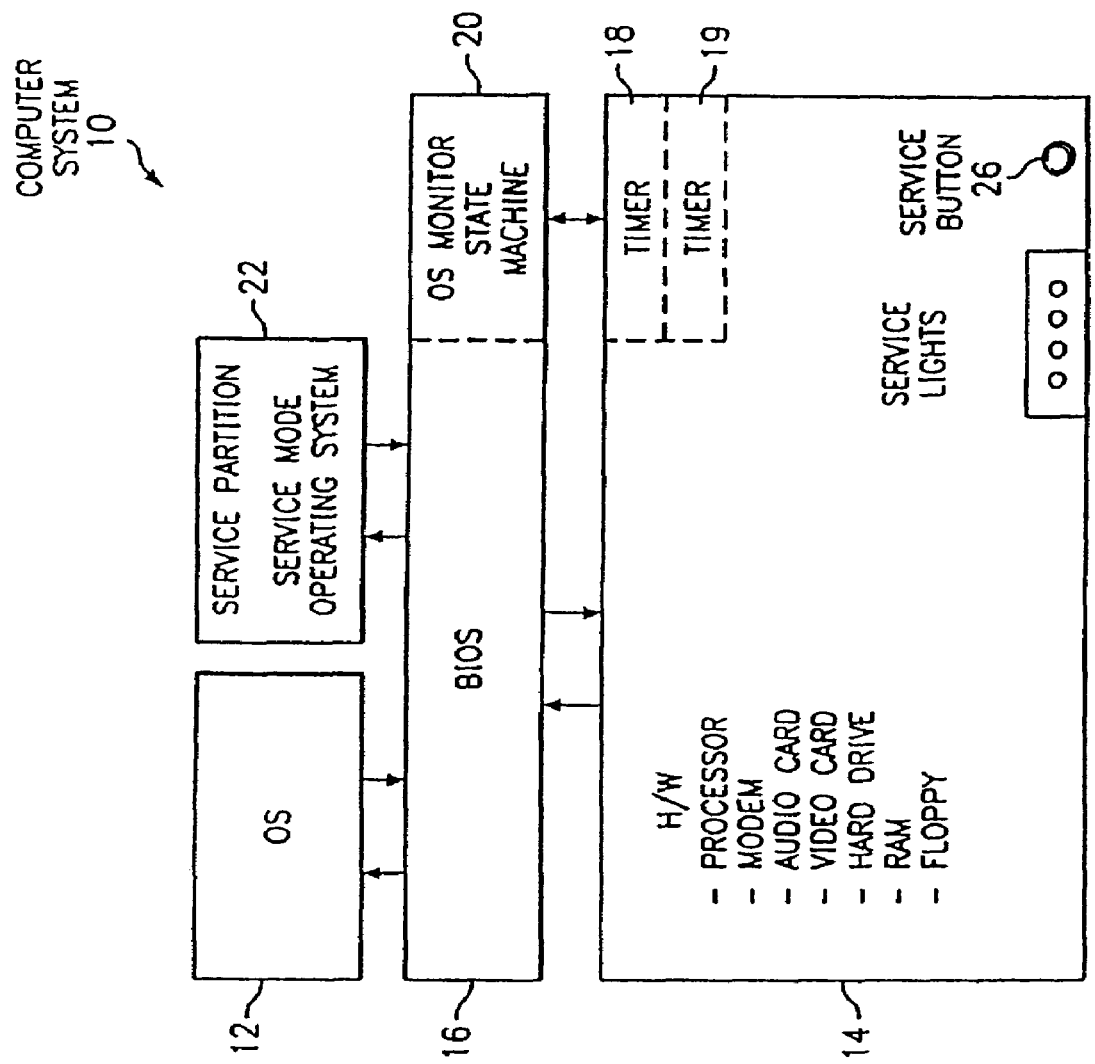
FIG. 1 depicts a block diagram of a computer system monitored by an operating system monitor state machine.

Referring now to FIG. 1, a block diagram depicts a computer system 10 having an operating system 12 interfaced with hardware components 14 through a basic input output system ("BIOS") 16. Hardware components 14 include conventional personal computer system hardware components such as a processor, modem, audio card, video card, and storage devices, including a hard drive, floppy drives, ROM and RAM. On initial power-up or upon initiation of a reboot, BIOS 16 directs a boot sequence, including a power on self test ("POST") and calling of the operating system. Within hardware 14 resides one or more timers 18 and 19, such as conventional watchdog timers.

Computer system 10 includes a service button 26 available for a computer user to press. Service button 26 provides a robust user interface that enables a user to initiate the problem detection and identification process. Service button 26 generates an interrupt into the computer system chip set to, for instance, initiate a service application. Monitor state machine 20 detects pressing of the service button and launches the service application at an appropriate time, or monitors the system behavior to detect computer system problems. Monitor state machine 20 monitors the functioning of operating system 12 with a watchdog or "hang detection" timer 19. When the service button is pressed, hang detection timer 19 is initiated, and is later cleared by an application run after completion of the calling up and booting of operating system 12 or service mode operating system 22. If the application does not clear hang detection timer 19 within a predetermined period of time, monitoring state machine 20 determines that an operating system hang-up has occurred. BIOS 16 then recognizes an operating system problem and initiates a predetermined reboot protocol, such as that described in co-pending U.S. application Ser. No. 09/377,726, which is incorporated herein by reference.

Figure 2:
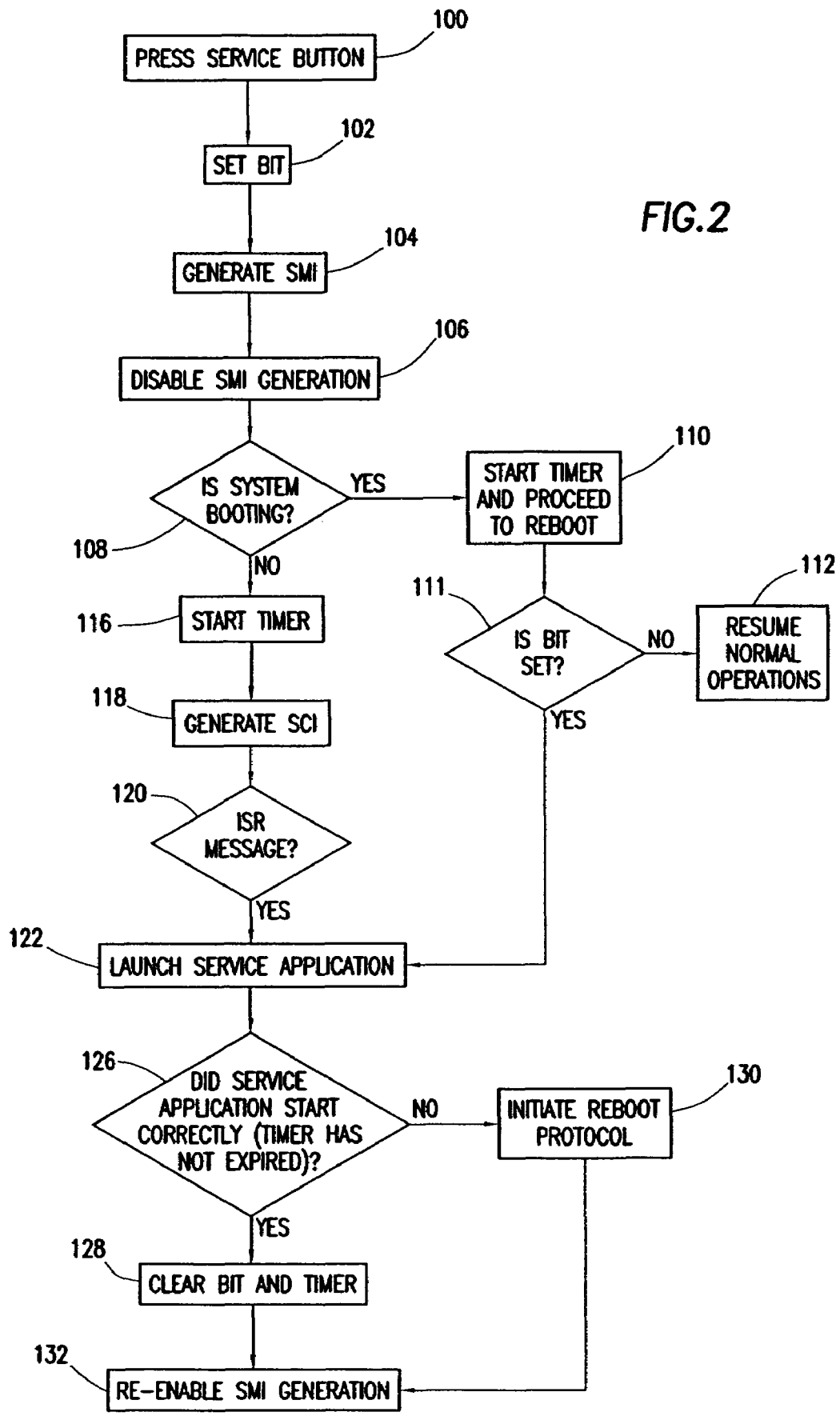
FIG. 2 depicts a flow diagram of initiation of a service application following pressing of a service button.
Figure 3:
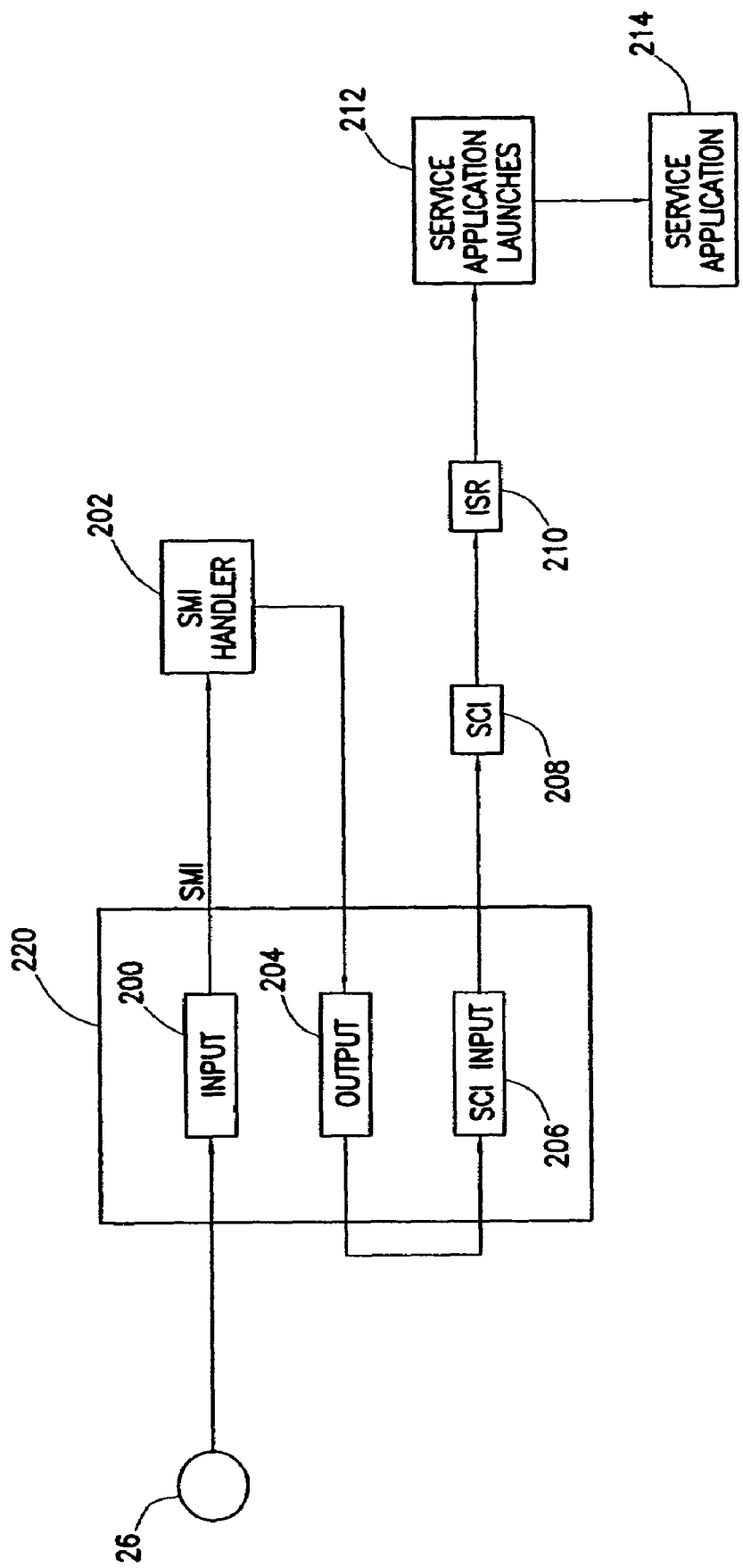
FIG. 3 depicts a block diagram of software and hardware elements used to initiate a service application.

As indicated above, the service button provides a standard mechanism through which a user can invoke assistance. Referring now to FIGS. 2 and 3, a user who seeks to invoke assistance will press service button 26 at step 100. Note that although not specifically shown, the flow chart depicted in FIG. 2 involves two execution spaces, one within the BIOS and the other within the operating system execution space. In general, communication to the operating system is handled by generating an interrupt, such as a system control interrupt (SCI), while communication from the operating system back to the BIOS is accomplished by running code that sets values in the BIOS, such as clearing a hang detection timer. The means by which the monitoring system in the BIOS communicates with the operating system and the operating system responds (if not hung), as will be more fully described below, provides unique advantages. Although the system is of necessity operating-system dependant since some portions reside within the operating system, it is also capable of leveraging the underlying personal computer architecture to allow the same mechanism in the BIOS to support multiple operating-system specific implementations. Further, the system enables user assistance to be invoked regardless of the functional state of the operating system.

As shown in FIG. 3, the service button 26 is wired directly to a specific input register 200 in the general purpose input/output register (GPIO) of the controller chip set 220, and pressing of the service button causes a bit in that input register to be set at step 102. The setting of this bit generates a system management interrupt (SMI) at step 104 to initiate state-sensitive interrupt handler code, an SMI handler 202, in the BIOS. The SMI handler 202 receives the SMI, and disables further SMI generation at step 106 until the present SMI has been serviced to ensure that if a user presses the service button multiple times, only one interrupt will be generated until that interrupt has been fully serviced.

At step 108, the SMI handler determines whether the computer system is booting by examining the appropriate bit in the CMOS register. If the system is currently booting, the general purpose input bit remains set while the system continues its boot sequence. A hang detection timer is also set at step 110, but the SMI handler takes no further action. When the system completes its boot sequence, or at a predetermined point in the booting sequence where it is known that hardware and software tested and run up to that point in the boot sequence are generally operational, such as when the user is prompted for a login ID, the operating system is directed to check the status of the service button bit at step 111. If the service button bit has been set, indicating that the button was pressed during boot, the operating system will launch a service application at step 122, otherwise it will resume normal operations (step 112). In one embodiment, a background task such as a service application launcher associated with the operating system, which is run as part of the normal boot process, checks the service button bit. If the service button bit is set, the service application launches the service application.

If, at step 108, the SMI handler determines that the system is not booting, the SMI handler initiates a hang detection timer at step 116. This hang detection timer could be the same timer as would be set in step 110 above or a different timer. The value to which the timer is set, however, will be different depending on whether the service button was pressed during boot or otherwise. If pressed during boot it will be set to a higher value, representing the longer amount of time required to allow the system to complete the boot cycle and launch the service application. If not pressed during boot, the timer will be set to a lower value, representing the shorter amount of time required to allow the system to process the interrupt (described below) and start the service application.

If the system is not booting, the SMI handler code in the BIOS subsequently communicates with the operating system by causing an interrupt at step 118. In one embodiment, this interrupt is a system control interrupt (SCI) that is serviced in operating system execution space. To initiate the SCI, the SMI handler sets an output bit 204 in an output register in the GPIO. As shown in FIG. 3, this bit is used as an input to a system control interrupt input 206, which in turn initiates the SCI 208. At step 120, the SCI is processed by an interrupt service routine (ISR) 210 in the operating system execution space. The ISR provides a message to the operating system to initiate a service application. In one embodiment this is achieved by sending a message to the service application launcher 212 associated with the operating system, which starts the service application 214 at step 122.

Regardless of whether the service button was pressed during boot or otherwise, if the service application starts correctly, as determined at step 126, the service button bit and hang detection timer are cleared at step 128. In one embodiment, the service application notifies the service application launcher and instructs it to clear the service button bit and the hang detection timer. If the service application has not started correctly (the timer has reached zero before being cleared), it may indicate an operating system hang-up or, at minimum, that it is incapable of properly starting the service application. Thus, the system begins to follow a predetermined reboot protocol in step 130, such as that described in detail in co-pending U.S. application Ser. No. 09/377,726, which is incorporated herein by reference. Finally, once the SMI has been fully serviced the SMI handler reenables SMI generation at step 132 so that subsequent pressing of the service button will cause another interrupt and initiate servicing as described above.

Thus, the system and method of the present invention provide a unique way in which to invoke user assistance in a uniform fail-safe way. The manner in which the code in the BIOS execution space communicates with the operating system and vice versa enables invocation of a service request that is operating system independent, and provides a monitoring system that is outside of the operating system so as to be able to monitor the operating system itself. Further, the system and method described above enables a user to invoke assistance regardless of the state of the operating system (i.e. during booting or otherwise, or when the operating system is hung).

Although the present invention has been described in detail, it should be understood that various changes, substitutions and alterations can be made hereto without departing from the spirit and scope of the invention as defined by the appended claims.

What is claimed is:

1. A computer system, comprising:
a processor;
a memory;
and
an external button that when pushed is operable to set a bit in a register of the computer system for generating an interrupt to initiate an application for providing technical support for the computer system, wherein additional pushes of the external button do not interfere with initiation of a technical support program, and wherein the interrupt is not cleared until the technical support program starts correctly.

2. The computer system of claim 1, wherein the application for providing technical support for the computer is able to be initiated without respect to the operating state of the computer system.

3. The computer system of claim 1, wherein the application for providing technical support for the computer is able to be initiated without respect to whether the computer system is in a booting or non-booting state.

4. A method for providing technical support to a computer system, comprising the step of:
providing a computer system, the computer system comprising,
a processor;
a memory;
and
an external button that when pushed is operable to set a bit in a register of the computer system for generating an interrupt to initiate a technical support program;
preventing additional pushes of the external button from interfering with the initiation of or restarting the initiation of a technical support program; and
clearing the interrupt only after the technical support program starts correctly.

5. The method for providing technical support to a computer system of claim 4, wherein the technical support program is operable to be initiated without respect to the operating state of the computer system.

6. The method for providing technical support to a computer system of claim 4, wherein the technical support program is operable to be initiated without respect to whether the computer system is in a booting or non-booting state.

7. The method for providing technical support to a computer system of claim 4, further comprising the steps:
setting a timer in the computer system following the step of pushing the external button, the timer having an expiration;
determining whether the technical support program has been successfully started before the expiration of the timer; and
booting the computer if the technical support program is not successfully started before the expiration of the timer.

8. A method for initiating a technical support program in a computer system, comprising the step of:
initiating a technical support program by pushing an external button, wherein the button, when pushed, is operable to set a bit in a register of the computer system for generating an interrupt to initiate the technical support program, and wherein the technical support program is operable to be initiated without respect to the operating state of the computer system;
preventing additional pushes of the external button from interfering with the initiation of the technical support program; and
preventing the clearing of the interrupt until the technical support program starts correctly.

9. The method for initiating a technical support program of claim 8, wherein the technical support program is operable to be initiated whether the computer system is in a booting or non-booting state.

10. A data processing system, comprising:
a processor;
an external button that when pressed is operable to set a bit in a register of the data processing system for generating an interrupt that initiates a technical support program without reference to the operating state of the data processing system, wherein additional presses of the external button do not interfere with the initiation of the technical support program, and wherein the interrupt is not cleared until the technical support program starts correctly.

11. The data processing system of claim 10, wherein the technical support program is operable to be initiated by the pressing of the external button whether the data processing system is in a booting or non-booting state.

12. The data processing system of claim 11, further comprising an interrupt handler that is operable to set an interrupt on the initiation of the technical support program.

13. The data processing system of claim 12, wherein the further comprising a timer that is set when the external button is pressed; and
wherein the data processing system is reset if the technical support program is not successfully started before the expiration of the timer.

14. A method for providing technical support in a data processing system, comprising the steps of:
providing a data processing system having,
an external button operable to initiate a technical support program, the button operable to set a bit in a register of the data processing system for generating an interrupt to initiate the technical support program;
pressing the external button to initiating the technical support program; and
preventing additional presses of the external button from interfering with the initiation of the technical support program;
running the technical support program to provide technical support for the data processing system; and
preventing the clearing of the interrupt until the technical support program starts correctly.

15. The method for providing technical support of claim 14, wherein the step of running the technical support program comprises the step of running the technical support program to provide technical support for the data processing system whether the data processing system is in a booting or a non-booting state.

* * * * *